United States Patent
Weber

(10) Patent No.: US 9,045,114 B2
(45) Date of Patent: Jun. 2, 2015

(54) BEAM BLADE WINDSHIELD WIPER ASSEMBLY HAVING A FLUID MANIFOLD MOUNTING SYSTEM

(75) Inventor: Christopher A. Weber, Troy, MI (US)

(73) Assignee: TRICO PRODUCTS CORPORATION, Rochester Hills, MI (US)

( * ) Notice: Subject to any disclaimer, the term of this patent is extended or adjusted under 35 U.S.C. 154(b) by 653 days.

(21) Appl. No.: 13/239,501

(22) Filed: Sep. 22, 2011

(65) Prior Publication Data

US 2012/0066857 A1 Mar. 22, 2012

Related U.S. Application Data

(60) Provisional application No. 61/385,350, filed on Sep. 22, 2010.

(51) Int. Cl.
 *B60S 1/38* (2006.01)
 *B60S 1/52* (2006.01)

(52) U.S. Cl.
 CPC .............. *B60S 1/524* (2013.01); *B60S 1/3862* (2013.01); *B60S 1/381* (2013.01); *B60S 1/3863* (2013.01); *B60S 1/3886* (2013.01)

(58) Field of Classification Search
 CPC .............. B60S 1/46; B60S 1/48; B60S 1/481; B60S 1/482; B60S 1/483; B60S 1/485; B60S 1/486; B60S 1/487; B60S 1/488; B60S 1/50; B60S 1/52; B60S 1/522; B60S 1/524; B60S 1/526; B60S 1/528
 USPC .............. 15/250.01, 250.02, 250.03, 250.04, 15/250.201
 See application file for complete search history.

(56) References Cited

U.S. PATENT DOCUMENTS

| 2,910,715 | A | * | 11/1959 | Ohrt ............................. 15/250.04 |
| 3,082,464 | A | * | 3/1963 | Smithers .................. 15/250.201 |
| 6,836,924 | B2 | | 1/2005 | Egan-Walter |
| 2001/0008265 | A1 | * | 7/2001 | Hauer .......................... 248/74.2 |

(Continued)

FOREIGN PATENT DOCUMENTS

| EP | 0724993 B1 | 5/1999 |
| EP | 1209050 A2 | 5/2002 |

(Continued)

OTHER PUBLICATIONS

EP2783225B1 (machine translation), 2001.*

(Continued)

*Primary Examiner* — Mark Spisich
*Assistant Examiner* — Andrew A Horton
(74) *Attorney, Agent, or Firm* — Howard & Howard Attorneys PLLC

(57) ABSTRACT

A beam blade windshield wiper assembly including a wiping element that contacts the surface of the vehicle to be wiped. An elongated beam is operatively attached to the wiping element and has a pair of longitudinal ends. An airfoil assembly is operatively supported on the elongated beam. The assembly also includes a fluid manifold for distributing fluid across the surface to be wiped. The manifold has an inlet in fluid communication with a source of fluid, a plurality of outlets disposed along the longitudinal length of the manifold and an internal passage extending between the inlet and the outlets. A fluid manifold mounting system is adapted to support the fluid manifold on the elongated beam.

17 Claims, 4 Drawing Sheets

(56) References Cited

U.S. PATENT DOCUMENTS

| | | | |
|---|---|---|---|
| 2004/0188569 A1 * | 9/2004 | Bauer | 248/68.1 |
| 2009/0172907 A1 | 7/2009 | Egner-Walter et al. | |
| 2010/0218332 A1 | 9/2010 | Stankiewicz et al. | |

FOREIGN PATENT DOCUMENTS

| | | | | |
|---|---|---|---|---|
| EP | 1918167 | A1 | 7/2008 | |
| FR | EP 0565443 | A1 * | 10/1993 | B60S 1/38 |
| FR | 2727365 | B1 | 12/1996 | |
| FR | 2750100 | A1 | 12/1997 | |
| FR | 2750381 | A1 | 1/1998 | |
| FR | 2756527 | A1 | 6/1998 | |
| FR | 2756528 | A1 | 6/1998 | |
| FR | EP 0724993 | A1 * | 5/1999 | B60S 1/46 |
| FR | EP 2783225 | B1 * | 2/2001 | B60S 1/52 |
| FR | 2929904 | A1 | 10/2009 | |
| GB | 2145928 | A * | 4/1985 | B60S 1/38 |
| WO | 2008052961 | A1 | 5/2008 | |
| WO | 2009127458 | A1 | 10/2009 | |
| WO | 2010098877 | A1 | 9/2010 | |

OTHER PUBLICATIONS

EP0724993A1 (machine translation), 1999.*
EP0565443 (machine translation), 1993.*
DE Application 11 2011 103 171.8 Examination Report dated 11.05.213.
May 3, 2012 International Search Report and Written Opinion for PCT/US2011/052681.

* cited by examiner

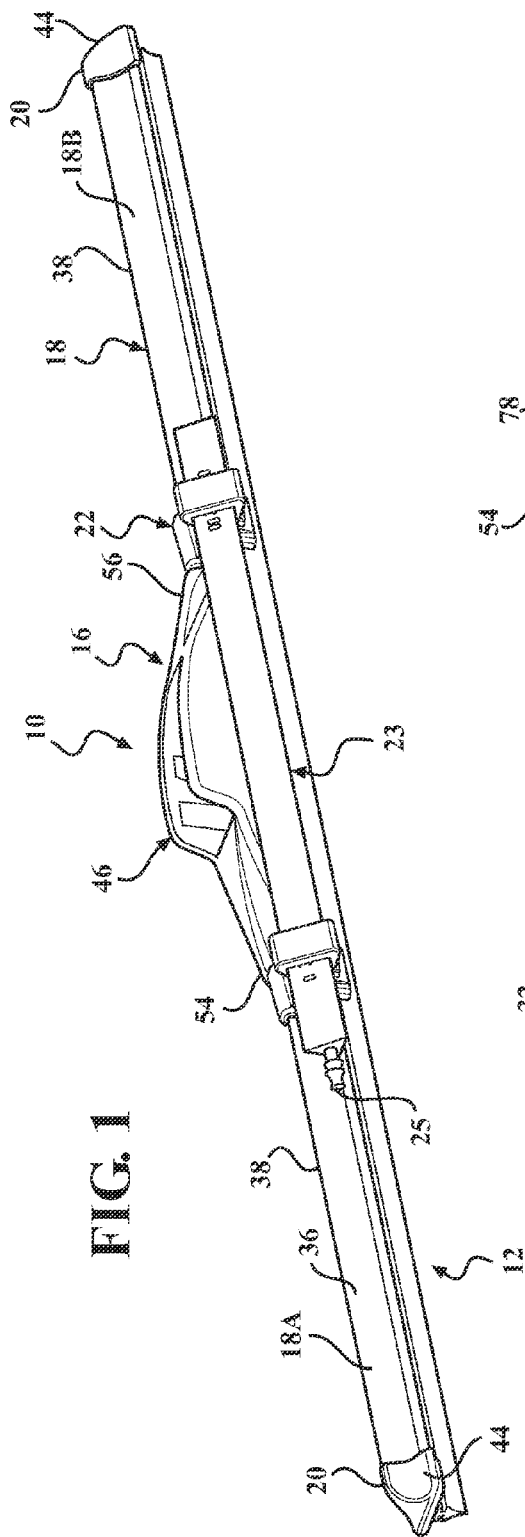
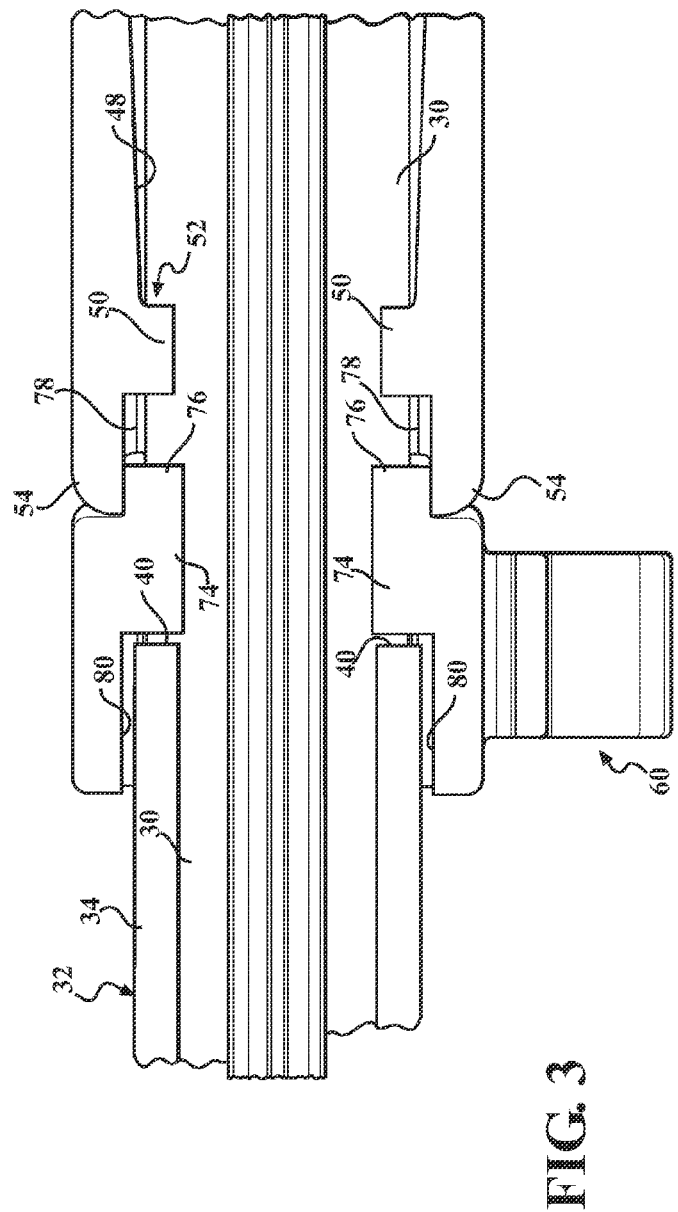

BEAM BLADE WINDSHIELD WIPER ASSEMBLY HAVING A FLUID MANIFOLD MOUNTING SYSTEM

CROSS REFERENCE TO RELATED APPLICATIONS

This application claims the benefit of U.S. provisional patent application entitled "Beam Blade Windshield Wiper Assembly Having a Fluid Manifold Mounting System," having Ser. No. 61/385,350, and filed on Sep. 22, 2010.

BACKGROUND OF THE INVENTION

1. Field of the Invention

The present invention relates, generally, to windshield wiper assemblies. More specifically, the present invention relates to a beam blade windshield wiper assembly having a fluid manifold mounting system.

2. Description of the Related Art

Conventional windshield wiper assemblies known in the related art include some type of wiper blade assembly mounted to an arm which, in turn, is mounted adjacent to a surface to be wiped, such as a windshield. The wiper arm is pivotally driven to impart reciprocal motion to the wiper blade assembly across the windshield. A rubber wiping element is supported by the blade assembly and contacts the windshield across the surface to be wiped. Wiper assemblies commonly known in the related art typically incorporate one or more metal strips that act to reinforce the wiper element and facilitate wiping contact by the element across what is typically a curved glass surface. In this context, the wiper arm delivers a downward force to the blade assembly that is distributed thereacross, pressing the blade assembly into contact with the surface to be wiped.

Some windshield wiper systems include a manifold that is used to distribute windshield wiper fluid across the surface to be wiped for cleaning purposes. The manifold is either incorporated into the wiper blade, the wiper arm, or mounted to these structures. While the systems have generally worked for their intended purposes, some disadvantages remain. For example, the windshield wiper systems having a fluid manifold of the type generally known in the related art are typically not very aesthetically pleasing and are relatively complex and require numerous steps to manufacture and mount the manifold to the wiper blade. Thus, there remains a need in the art for a windshield wiper that is adapted to quickly, efficiently and cost-effectively mount a fluid manifold thereto.

SUMMARY OF THE INVENTION

The present invention overcomes the disadvantages in the related art in a beam blade windshield wiper assembly having a wiper element that contacts the surface to be wiped, at least one elongated beam having a pair of longitudinal ends and an airfoil assembly operatively supported on the elongated beam. The windshield wiper assembly also includes a fluid manifold that acts to distribute fluid across the surface to be wiped. The manifold has an inlet in fluid communication with a source of fluid, a plurality of outlets disposed along the longitudinal length of the manifold and an internal passage extending between said inlet and between the inlet and the plurality of outlets. Finally, the windshield wiper assembly of the present invention also includes a fluid manifold mounting system that is adapted to support the fluid manifold and the elongated beam.

The beam blade windshield wiper assembly having the fluid manifold mounting system of the present invention is aesthetically pleasing and cooperates with the coupler and the airfoil to limit windlift. In addition, the fluid manifold mounting system may be quickly, efficiently, and cost-effectively manufactured and then mounted to the windshield wiper assembly.

Other objects, features and advantages of the present invention will be readily appreciated as the same becomes better understood after reading the subsequent description taken in connection with the accompanying drawings.

BRIEF DESCRIPTION OF THE DRAWINGS

FIG. 1 is a perspective view of a windshield wiper assembly;

FIG. 3 is a bottom plan view illustrating the nesting relationship between the fluid manifold mounting system and the coupler, as well an airfoil segment of the windshield wiper assembly;

DETAILED DESCRIPTION OF THE PREFERRED EMBODIMENT(S)

Referring now to the figures, where like numerals are used to designate like structure, a beam blade windshield wiper assembly is generally indicated at 10 in FIG. 1. The windshield wiper assembly is adapted to be releasably mounted to a wiper arm (not shown, but commonly known in the art). In turn, the wiper arm is operatively engaged to a motor (not shown) that drives the wiper arm in an oscillating manner across the surface to be wiped, which is typically a windshield. Those having ordinary skill in the art will appreciate that wiper assemblies 10 may be employed in other areas of a vehicle, such as a rear window (not shown) or a head lamp (not shown) that employs a wiper system. Thus, it will be understood that the present invention is not limited for use solely in connection with wiper arms adjacent to a vehicle's windshield, but for use in all applications where wiper assemblies 10 are employed.

Figure 2:
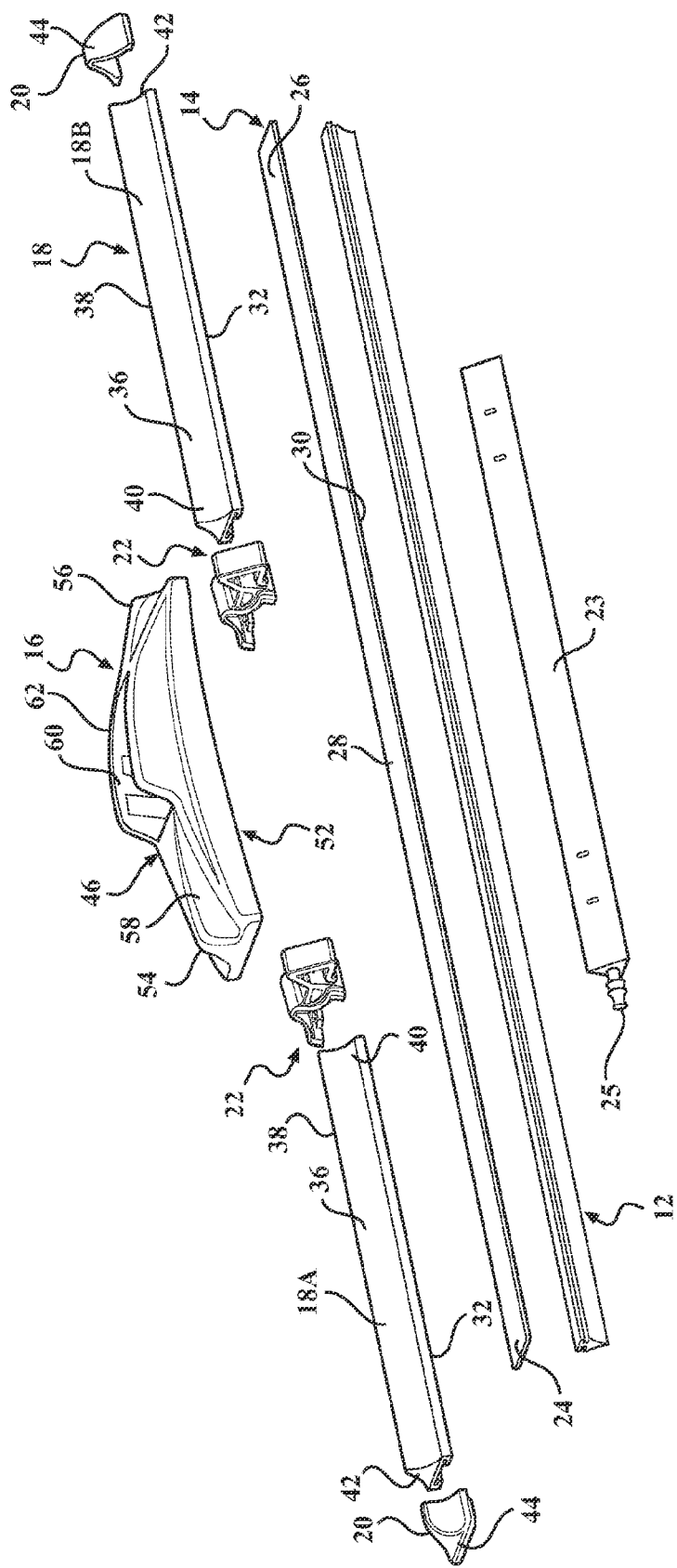
FIG. 2 is an exploded view of a windshield wiper assembly.
Figure 4:
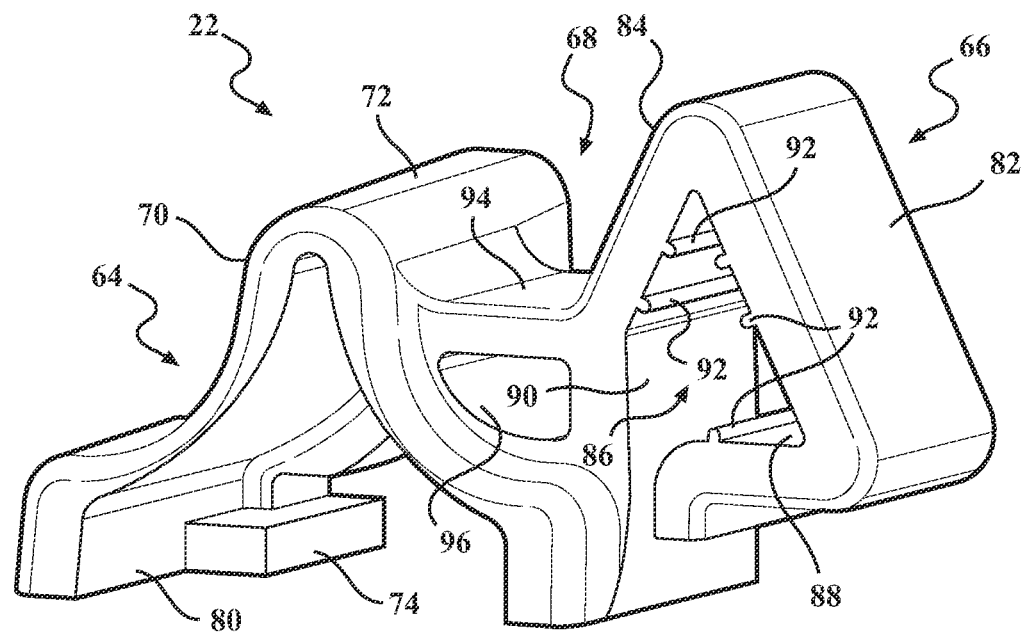
FIG. 4 is a perspective view of the fluid manifold mounting system of the present invention.
Figure 5:
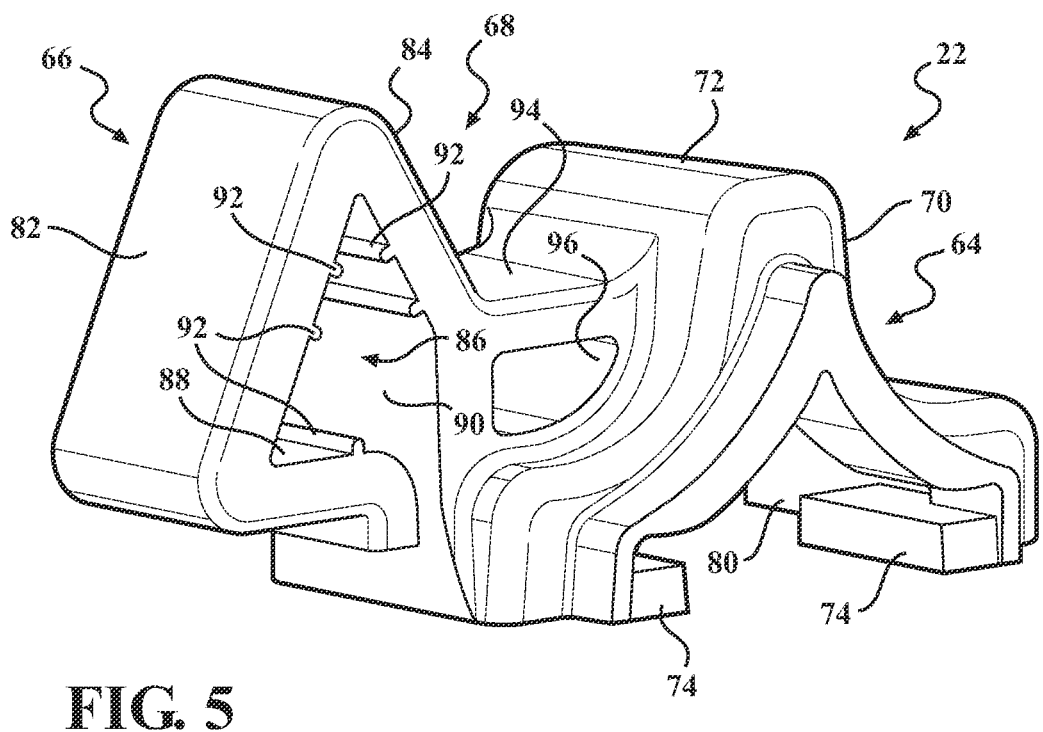
FIG. 5 is an opposite perspective view of the fluid manifold mounting system of the present invention.
Figure 6:
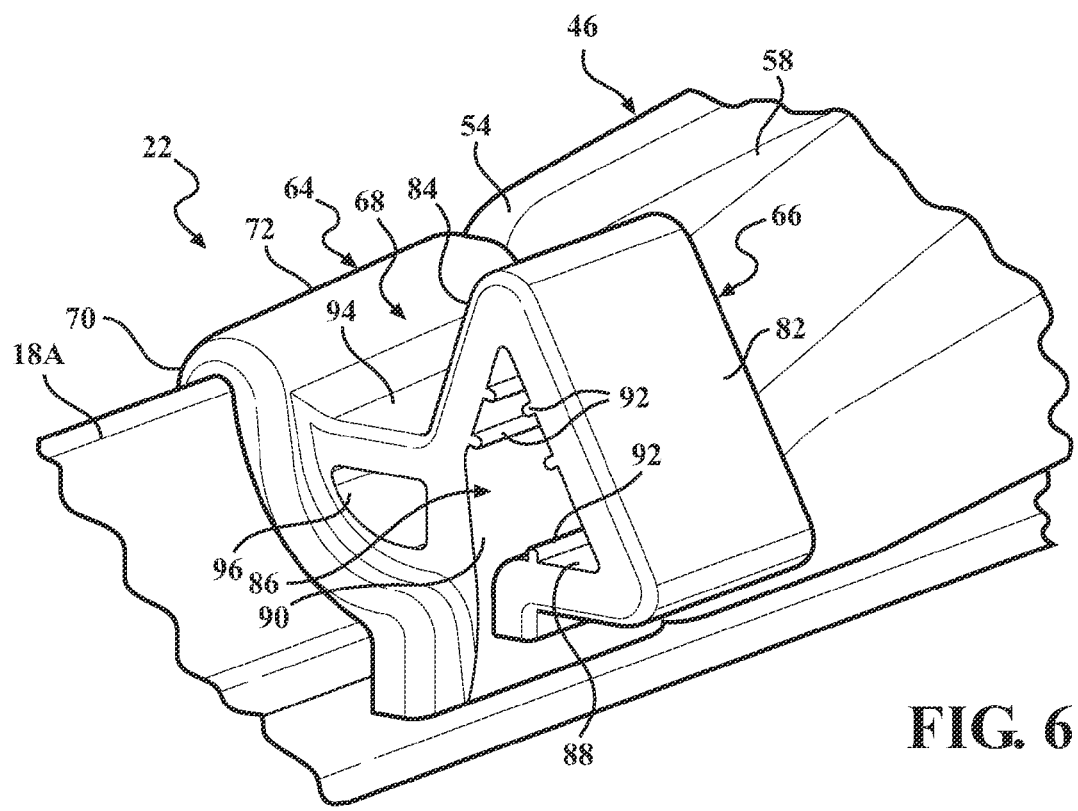
FIG. 6 is a partial perspective view illustrating the fluid manifold mounting system disposed at one end of the coupler of the windshield wiper assembly.
Figure 7:
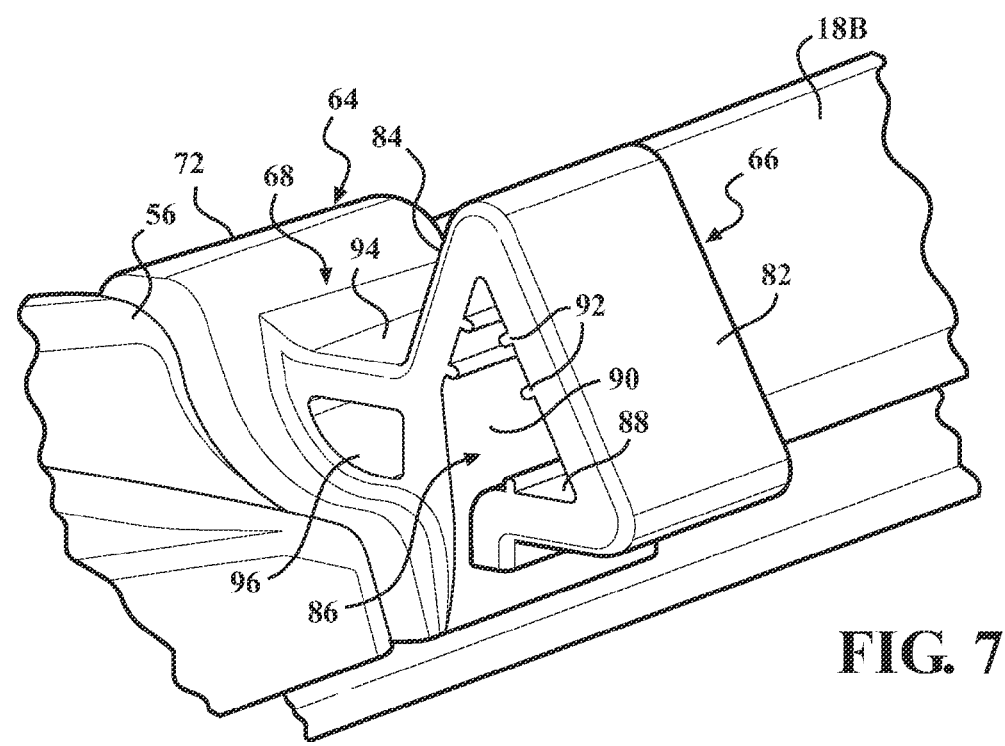
FIG. 7 is a partial perspective view illustrating the fluid manifold mounting system disposed adjacent the opposite end of the coupler of the windshield wiper assembly of the present invention.

Referring to FIGS. 1-2, the wiper assembly 10 includes a wiping element, generally indicated at 12, that is adapted to contact the surface of the vehicle to be wiped. An elongated beam, generally indicated at 14, is operatively attached to the wiping element 12. A coupler assembly, generally indicated at 16, interconnects the wiper assembly 10 to the wiper arm. The windshield wiper assembly 10 may also include an airfoil, generally indicated at 18, as well as end caps 20 that are attached to the distal ends of the elongated beam 14. In addition, the windshield wiper assembly 10 may also include a fluid manifold mounting system, generally indicated at 22. The fluid manifold mounting system 22 is adapted to operatively support a fluid manifold 23 that is used to distribute windshield wiper fluid across the surface to be wiped. To this end, the manifold 23 is disposed in fluid communication with a source of windshield wiper fluid. Each of these elements will be described in greater detail below.

The wiping element 12 includes a predetermined length and cross-sectional profile corresponding to a particular application and is typically manufactured through an extrusion process, which enables the length and cross-sectional profile of the wiping element 12 to be easily adjusted without a substantial increase to manufacturing expense. Furthermore, while the wiping element 12 is constructed from a flexible rubber, those having ordinary skill in the art will appreciate that the wiping element 12 may be constructed from any flexible material, such as silicone or other polymer, and via any manufacturing process, such as injecting molding, without departing from the scope of the invention.

The elongated beam 14 is adapted to distribute downward pressure from the wiper arm across the wiping element 12. As a result, the elongated beam 14 includes longitudinal ends 24 and 26 that define a predetermined length capable of facilitating distribution of the downward pressure from the wiper arm assembly. The elongated beam 14 further includes a top end 28 and a bottom end 30 disposed between the longitudinal ends 24 and 26. In the embodiment illustrated in the figures, the wiping element 12 is operatively mounted to the bottom end 30 of the elongated beam 14 by an adhesive/epoxy. However, those having ordinary skill in the art will appreciate that the elongated beam 14 may be operatively mounted to the wiping element 12 by other methods such as through a slot defined within the elongated beam 14 that receives a portion of the wiping element 12. Furthermore, those having ordinary skill in the art will appreciate that the wiper assembly 10 may include more than one elongated beam 14 or rails that are operatively engaged to the wiping element 12.

The elongated beam 14 may be constructed from any resiliently flexible material, such as spring steel or a polymer, that facilitates the application of force from the spring-loaded wiper arm across the span of the elongated beam 14 toward the first and second longitudinal ends 24 and 26. To that end, the elongated beam 14 may be curved longitudinally with a predetermined radius of curvature that is the same or greater than the plane of curvature of the windshield. This predetermined radius of curvature is sometimes referred to in the related art as a "free form" radius of curvature (hereinafter "windshield curvature"). Accordingly, the curvature of the elongated beam 14 may be symmetrical or asymmetrical depending on the force requirements and the contour of the windshield. The flexible, free form, pre-curved elongated beam 14 straightens out when the wiper arm applies a force thereto to flatten the elongated beam 14 and direct the wiping element 12 to contact the windshield. Thus, the elongated beam 14 includes a free-form curvature that ensures force distribution on windshields having various curvatures that effects proper wrapping about the windshield.

The elongated beam 14 includes a substantially constant thickness and may have a constant width throughout the length between the first and second longitudinal ends 24 and 26. The constant thickness is adapted to provide high lateral and torsional stiffness to avoid lateral and torsional deflection, which causes the wiping element 12 to stick/slip ("chatter") on the windshield during operation. Thus, the cross-section of the elongated beam 14 is substantially uniform, which makes it easier to manufacture. More specifically, where the elongated beam 14 is constructed from metal, such as spring steel, the tools and machinery used to manufacture the elongated beam 44 are less complicated than that required to manufacture a beam 14 having a varying thickness. Furthermore, where the elongated beam 14 is constructed from a polymer, such as a thermoplastic elastomer, the tools and extrusion process machinery are also less complicated than those employed to manufacture an elongated beam having a varying thickness. However, those having ordinary skill in the art will appreciate that the elongated beam 14 illustrated herein may include a varying thickness and/or outer profile (width) without departing from the scope of the invention. By way of example, the width and/or thickness of the elongated beam 14 may taper linearly from the beam center, sinusoidally, parabolically, or asymmetrically. Additionally, the elongated beam 14 illustrated throughout the figures is a single, integral piece of material such that it defines a solid cross-section. However, those having ordinary skill in the art will appreciate that the elongated beam 14 may be formed into a single piece or multiple pieces by a plurality of laminates.

The airfoil, generally indicated at 18 acts to reduce the likelihood of windlift during operational movement across the surface to be wiped. In the representative embodiment illustrated here, the airfoil 18 includes two segments 18A and 18B that include identical structure. Accordingly, the same reference numerals will be used to describe the structure of the two segments 18A and 18B of the airfoil 18.

The airfoil 18 includes a base, generally indicated at 32. The base 32 includes an attachment portion 34 (FIG. 3) that engages the elongated beam 14. More specifically, the attachment portion 34 of each of the segments 18A and 18B engage a portion of the top end 28 and bottom end 30 between the longitudinal ends 24 and 26, thereby joining the airfoil 18, wiping element 12 and elongated beam 14 together. Those having ordinary skill in the art will appreciate that the airfoil 18, elongated beam 14 and wiping element 12 may be joined together through other means such as bonding the airfoil 18 to the top end 28 of the elongated beam 14 via adhesive/epoxy or by employing additional structure such as a retainer or spline that couples the wiping element 12 to the elongated beam 14 or the elongated beam 14 to the airfoil 18 without departing from the scope of the invention.

The airfoil 18 further includes a contoured profile that defines a spoiler 36 that is adapted to utilize airflow to increase downward force on to the wiper assembly 12 during operational movement across the surface to be wiped. To this end, the spoiler 36 tapers inwardly from the base 32 toward a terminal point 38 to define a profile that is slightly contoured. As shown in FIGS. 1 and 2, the profile of the spoiler 36 is substantially symmetrical in cross-section. However, those having ordinary skill in the art will appreciate that the spoiler 36 may include an asymmetrical cross-sectional profile without departing from the scope of the invention. Additionally, those having ordinary skill in the art will appreciate that the airfoil 18 may include a solid-core spoiler 36 or a hollow-core spoiler 36 without departing from the scope of the invention. As best shown in FIG. 2, each of the two segments 18A and 18B of the airfoil 18 include interior terminal ends 40 and distal terminal ends 42. The interior terminal ends 40 are disposed proximal to the coupler 16, as will be explained in greater detail below. The distal terminal ends 42 cooperate with a pair of end caps 20, as will be explained in greater detail below.

The airfoils 18A and 18B of the present invention are manufactured from a thermoplastic material and using a manufacturing process that may be the same as described above relative to the wiping element 12. However, it should be appreciated that the airfoils 18 may be manufactured using a different process and/or different material. By way of example, the airfoils 18 may be manufactured via an injection molding process using a polymer composition having greater hydrophobic properties than the materials used for manufacturing the wiping element 12.

As noted above, the end caps 20 are adapted to operatively engage the distal terminal ends 42 of the two segments 18A and 18B of the airfoil 18. The end caps 20 include a profile that substantially mimics the contours of the airfoil 18 to maintain the windlift characteristics of the wiper assembly 10 and to provide an increased aesthetic value. The end caps 20 include a closed end 44 that covers the longitudinal ends 24 and 26 of the elongated beam 14 adjacent the distal terminal ends 42 and the airfoil 18. The closed end 44 prevents infiltration of water, ice, and debris between the elongated beam 14 and the airfoil 18, which may prevent proper operation of the wiper assembly 10. The closed end 44 of the end caps 20 may be adapted to extend beyond the longitudinal ends 24 and 26 of the elongated beam 14 to facilitate contact between the outer extremities of the wiping element 18 and the surface to be wiped. More specifically, the end caps 20 provide a mass increase adjacent to the longitudinal ends 24 and 26 of the elongated beam 14 that reduce the likelihood of localized chatter along the extremities of the wiping element 10 caused by the combination of windlift and a decrease in the force distributed to this area from wiper arm via the elongated beam 14, as described above.

The coupler assembly 16 includes a coupler, generally indicated at 46, and an adapter that is operatively supported by the coupler 46. More specifically, the coupler 46 is disposed along an intermediate position between the first and second airfoils 18A and 18B. Contrary to conventional beam blade-style wiper assemblies, which include a small contact point through which force from the wiper arm is distributed, the coupler 46 broadens the initial point through which force is applied from the wiper arm to the elongated beam 14. In this manner, the downward force from the wiper arm is distributed with more efficiency across the elongated beam 14, thereby reducing the likelihood of windlift and improving wiping action.

Referring to FIG. 3, the coupler 46 includes an interior surface 48 that is disposed in proximate relation to the elongated beam 14. The interior surface 48 includes a plurality of transversely extending tangs 50 that are adapted to operatively engage the bottom end 30 of the elongated beam 14. The tangs 50 cooperate with the remaining structure of the interior surface 48 to define a track, generally indicated at 52, that operatively receives an intermediate portion of the elongated beam 14. In one embodiment, the interior surface 48 may include four transversely extending tangs 50 operatively disposed adjacent to the airfoil segments 18A and 18B to accommodate the resiliency of the elongated beam 14. In this manner, a portion of the elongated beam 14 is retained within the track 52, but remains able to flex in response to the curvature of the surface to be wiped. Those having ordinary skill in the art will appreciate that the tangs 50 may include additional structure to prevent axial movement between the coupler 46 and the elongated beam 14. By way of example, one or more of the tangs 50 may further include a post and the elongated beam 14 may include a corresponding detent that is adapted to receive the post to prevent such axial movement of the coupler 46 relative to the elongated beam 14. Those having ordinary skill in the art will appreciate that the elongated beam 14 may be operatively attached to the coupler 46 by several methods other than as described above. By way of example, the coupler 46 may be fixed by adhesive, riveted or welded to the elongated beam 14.

The coupler 46 further includes a first end 54 that is disposed adjacent to one of the airfoil segments 18A and a second end 56 that is disposed adjacent to the other airfoil segment 18B. The first and second ends 54, 56 each include a contoured exterior surface that substantially corresponds to the contoured profile of the airfoil segments 18A and 18B. One end 54 includes a relief surface 58 that tapers downwardly toward one of the airfoil segments 18B. The relief surface 58 is essentially a depression that is designed to accommodate the wiper arm.

The coupler 46 includes an opening 60 formed in the top surface 62 of the coupler 46. A cross-pin may extend laterally across the opening 60 and is adapted to cooperatively support the adaptor. In turn, the adapter facilitates interconnection with the attachment member of a windshield wiper arm. The attachment member may be of any number of known conventional types. Thus, those having ordinary skill in the art will appreciate that the adapter may facilitate operable connection between the windshield wiper assembly and a wiper arm having various style attachment members as commonly known in the art.

As noted above, some windshield wiper systems include a manifold 23 that is used to distribute windshield wiper fluid across the surface to be wiped. To this end, the manifold 23 may include an elongated body having an inlet 25, a plurality of outlets disposed along the longitudinal length of the manifold 23, as well as an internal passage extending between the inlet and the plurality of outlets. The inlet 25 is in fluid communication with a source of windshield wiper fluid and is employed to distribute this fluid across the surface to be wiped. Thus, the windshield wiper assembly 10 includes a fluid manifold mounting system, generally indicated at 22 in the figures. As best shown in FIGS. 4-7, the mounting system 22 includes a body, generally indicated at 64, a clip portion, generally indicated at 66, and a stabilizer, generally indicated at 68, that interconnects the body 64 and the clip 66. The body 64 is disposed in nesting relationship between the interior terminal ends 40 of the airfoils 18A and 18B and the first and second ends 54, 56 of the coupler 46. The body 64 mimics the contours of both the airfoil 18 and the coupler 46 to maintain the windlift characteristics of the wiper assembly 10 and to provide increased aesthetic value. Thus, the body 64 defines a spoiler portion 70 that is adapted to utilize air flow to increase downward force on the wiper assembly 10 during operational movement across the surface to be wiped. The spoiler portion 70 tapers inwardly toward a terminal point 72 to define a profile that is slightly contoured. The profile of the spoiler portion 70 is substantially symmetrical in cross-section. However, those having ordinary skill in the art will appreciate that the spoiler portion 70 may include an asymmetrical cross-sectional profile without departing from the scope of the invention.

As best shown in FIG. 3, the body 64 also includes a pair of inwardly extending legs 74 that are adapted to wrap around and operatively mount to the elongated beam 14. The legs 74 also define nubs 76 that are adapted to be received in a space 78 defined between the first and second ends 54, 56 of the coupler and the elongated beam 14 and substantially adjacent to the tangs 50. Thus, the body 64 of the mounting system 22 is disposed in nesting relationship with at least one end of the coupler 46. In the embodiment illustrated herein, the mounting system 22 employs two bodies 64, both of which are disposed in nesting relationship with the first and second ends 54, 56 of the coupler 46.

Similarly, the body 64 defines a female portion 80 disposed adjacent the legs 74 that is designed to receive the interior terminal ends 40 of each of the two airfoil segments 18A, 18B. Thus, the female portion 80 wraps around and encompasses the intern terminal ends 40 of the two airfoil sections 18A, 18B in nesting fashion.

The clip portion 66 is disposed spaced from the body 64 and is designed to removably support a fluid manifold 23. The fluid manifold 23 is also known as a "wet rail" in the related art. The clip portion 66 may be designed to accommodate the specific shape of the fluid manifold 23. For example, in one embodiment illustrated in FIGS. 1-2, the fluid manifold 23 may have at least a partially triangular shape. Thus, the clip portion 66 may include two legs 82, 84 that are disposed at an angle relative to one another to form a quasi-triangular space 86 that is adapted to accommodate the manifold 23. The clip portion 66 may also include a bottom wall 88 that is designed to support a lower surface of the manifold 23 and a side wall 90. Compression ribs 92 may be formed on the interior surface of the legs and walls 82, 84, 88, 90. The compression ribs 92 are designed to engage the outer surface of the manifold and to be compressed by an interference fit therebetween. In this way, the compression ribs 92 help to retain the manifold 23 in fixed relationship relative to the clip 66. Those having ordinary skill in the art will appreciate from the preceding description, however, that the legs and walls of the clip 66 may be disposed in any relationship relative to another so as to accommodate the shape of the fluid manifold 23.

The stabilizer 68 extends between the body 64 and the clip 66 and serves to offset the clip 66 from the body 64 while maintaining the structural integrity of the mounting system 22. To this end, the stabilizer 68 may include a rib 94 that extends between the body 64 and the sidewall 90 of the clip 66. A hollow space 96 may be defined between rib 94 and the sidewall 90 and the body 64. However, those having ordinary skill in the art will appreciate that the rib 94 may be formed as a solid mass that operatively extends between the sidewall 90 of the clip 66 and the body 64.

The mounting system 22 of the present invention may include a pair of bodies 64 disposed on either end of the coupler 46 between the coupler 46 and the two airfoil segments 18A, 18B so that the manifold is supported in the clips 66 in spaced relationship with respect to the coupler 46. The mounting system 22 may be manufactured from a thermoplastic material via an extrusion, injection-molding, or any other suitable process known in the related art. The mounting systems 22 are easily assembled to the windshield wiper assembly and are aesthetically pleasing while at the same time providing a stable and effective mechanism to mount a fluid manifold to the windshield wiper assembly 10.

The invention has been described in an illustrative manner. It is to be understood that the terminology which has been used is intended to be in the nature of words of description rather than of limitation. Many modifications and variations of the invention are possible in light of the above teachings. Therefore, the invention may be practiced other than as specifically described.

What is claimed is:

1. A beam blade windshield wiper assembly comprising:
a wiping element that contacts the surface to be wiped;
at least one elongated beam operatively attached to said wiping element and having a pair of longitudinal ends;
an airfoil assembly operatively supported on said elongated beam;
a fluid manifold for distributing fluid across the surface to be wiped, said manifold having an inlet in fluid communication with a source of fluid, a plurality of outlets disposed along the longitudinal length of said manifold and an internal passage extending between said inlet and said plurality of outlets; and
a fluid manifold mounting system adapted to support said fluid manifold on said elongated beam, said fluid manifold mounting system including a body operatively adapted to be mounted to said elongated beam, a clip portion including at least two legs that are disposed at an angle relative to one another to form a quasi-triangular space adapted to removably support said fluid manifold relative to said body, and a stabilizer extending between and interconnecting said body and said clip portion of said manifold mounting system and wherein said clip portion further includes a plurality of compression ribs formed on the interior surface of said clip portion, said compression ribs designed to engage the outer circumference of said manifold and to be compressed by an interference fit therebetween to thereby retain said manifold in fixed relationship with respect to said clip.

2. A windshield wiper assembly as set forth in claim 1 further including a coupler including first and second ends, said coupler mounted to said elongated beam between said longitudinal ends, said coupler acting to interconnect said wiper assembly to a wiper arm, said airfoil assembly having two segments disposed between said coupler and one of said pair of longitudinal ends of said elongated beam.

3. A windshield wiper assembly as set forth in claim 2 wherein said two segments of said airfoil assembly having a contoured profile, said first and second ends of said coupler having a contoured exterior surface that substantially corresponds to said contoured profile of said two segments of said airfoil assembly, said body of said manifold mounting system defining a spoiler portion that substantially corresponds to said contoured profile of said airfoil segments and said contoured exterior surface of said coupler, said spoiler portion adapted to utilize air flow to increase downward force on said windshield wiper assembly during operational movement across the surface to be wiped.

4. A windshield wiper assembly as set forth in claim 2 wherein said first and second ends of said coupler include a space, said body of said manifold mounting system including a pair of inwardly extending legs that are adapted to wrap around and operatively mount said body to said elongated beam, said legs defining nubs that are adapted to be received in nesting relationship with said space defined by said first and second ends of said coupler.

5. A windshield wiper assembly as set forth in claim 4 wherein said two airfoil segments each include interior terminal ends, said body of said manifold mounting system defining a female portion disposed adjacent said legs and that are designed to receive the interior terminal ends of each of said two airfoil segments in nesting relationship.

6. A windshield wiper assembly as set forth in claim 1 wherein said clip portion further includes a bottom wall that is designed to support said manifold and a sidewall disposed adjacent to one of said at least two legs.

7. A windshield wiper assembly as set forth in claim 6 wherein said plurality of compression ribs are formed on the interior surface of said legs and said bottom wall and sidewall, said compression ribs designed to engage the outer surface of said manifold and to be compressed by an interference fit therebetween to thereby retain said manifold in fixed relationship relative to said clip.

8. A windshield wiper assembly as set forth in claim 6 wherein said stabilizer includes a rib that extends between said body and said sidewall of said clip portion.

9. A windshield wiper assembly as set forth in claim 8 wherein said stabilizer may further include a hollow space defined between said rib and said sidewall of said body.

10. A beam blade windshield wiper assembly comprising:
a wiping element that contacts the surface to be wiped;
at least one elongated beam operatively attached to said wiping element having a pair of longitudinal ends;
a coupler mounted to said elongated beam between said longitudinal ends of said elongated beam, said coupler including first and second ends and acting to interconnect said wiper assembly to a wiper arm;
an airfoil assembly operatively supported on said elongated beam, said airfoil assembly having two segments with one of each of the two segments disposed between said coupler and one of said pair of longitudinal ends of said elongated beam;
a fluid manifold for distributing fluid across the surface to be wiped, said manifold having an inlet in fluid communication with a source of fluid, a plurality of outlets disposed along the longitudinal length of said manifold and an internal passage extending between said inlet and said plurality of outlets; and
a fluid manifold mounting system adapted to support said fluid manifold on said elongated beam, said fluid manifold mounting system including a pair of bodies adapted to be operatively mounted to said elongated beam, each body being disposed between said first and second ends of said coupler and an adjacent segment of said airfoil assembly in nesting relation thereto, each body including a clip portion adapted to removably support said fluid manifold relative to said body, and a stabilizer extending between and interconnecting said body and said clip portion of said manifold mounting system, said first and second ends of said coupler including a space, each said body of said manifold mounting system including a pair of inwardly extending legs that are adapted to wrap around and operatively mount said body to said elongated beam, said legs defining nubs that are adapted to be received in nesting relationship with said space defined by said first and second ends of said coupler.

11. A windshield wiper assembly as set forth in claim 10 wherein said two segments of said airfoil assembly have a contoured profile, said first and second ends of said coupler have a contoured exterior surface that substantially corresponds to said contoured profile of said two segments of said airfoil assembly, each body of said manifold mounting system defining a spoiler portion that substantially corresponds to said contoured profile of said airfoil segments and said contoured exterior surface of said coupler, said spoiler portion adapted to utilize air flow to increase downward force on said windshield wiper assembly during operational movement across the surface to be wiped.

12. A windshield wiper assembly as set forth in claim 10 wherein said two airfoil segments each include interior terminal ends, each body of said manifold mounting system defining a female portion disposed adjacent said legs and that are designed to receive the interior terminal ends of each of said two airfoil segments in nesting relationship.

13. A windshield wiper assembly as set forth in claim 10 wherein said clip portion of said fluid manifold mounting system includes at least two legs that are disposed at an angle relative to one another to form a quasi-triangular space that is adapted to accommodate said manifold.

14. A windshield wiper assembly as set forth in claim 13 wherein said clip portion further includes a bottom wall that is designed to support said manifold and a sidewall disposed adjacent to one of said at least two legs.

15. A windshield wiper assembly as set forth in claim 14 wherein said clip portion further includes a plurality of compression ribs formed on the interior surface of said legs and said bottom and sidewalls, said compression ribs designed to engage the outer surface of said manifold and to be compressed by an interference fit therebetween to thereby retain said manifold in fixed relationship relative to said clip.

16. A windshield wiper assembly as set forth in claim 14 wherein said stabilizer includes a rib that extends between said body and said sidewall of said clip portion.

17. A windshield wiper assembly as set forth in claim 16 wherein said stabilizer further includes a hollow space defined between said rib and said sidewall of said body.

* * * * *